G. I. ALDEN.
DRIVING AND REVERSING MECHANISM.
APPLICATION FILED MAY 12, 1920.

1,432,653.

Patented Oct. 17, 1922.
2 SHEETS—SHEET 1.

WITNESSES
John H. McKenna
J. Calvin Bright

INVENTOR
George I. Alden.
BY
Clayton R. Jenks
ATTORNEY

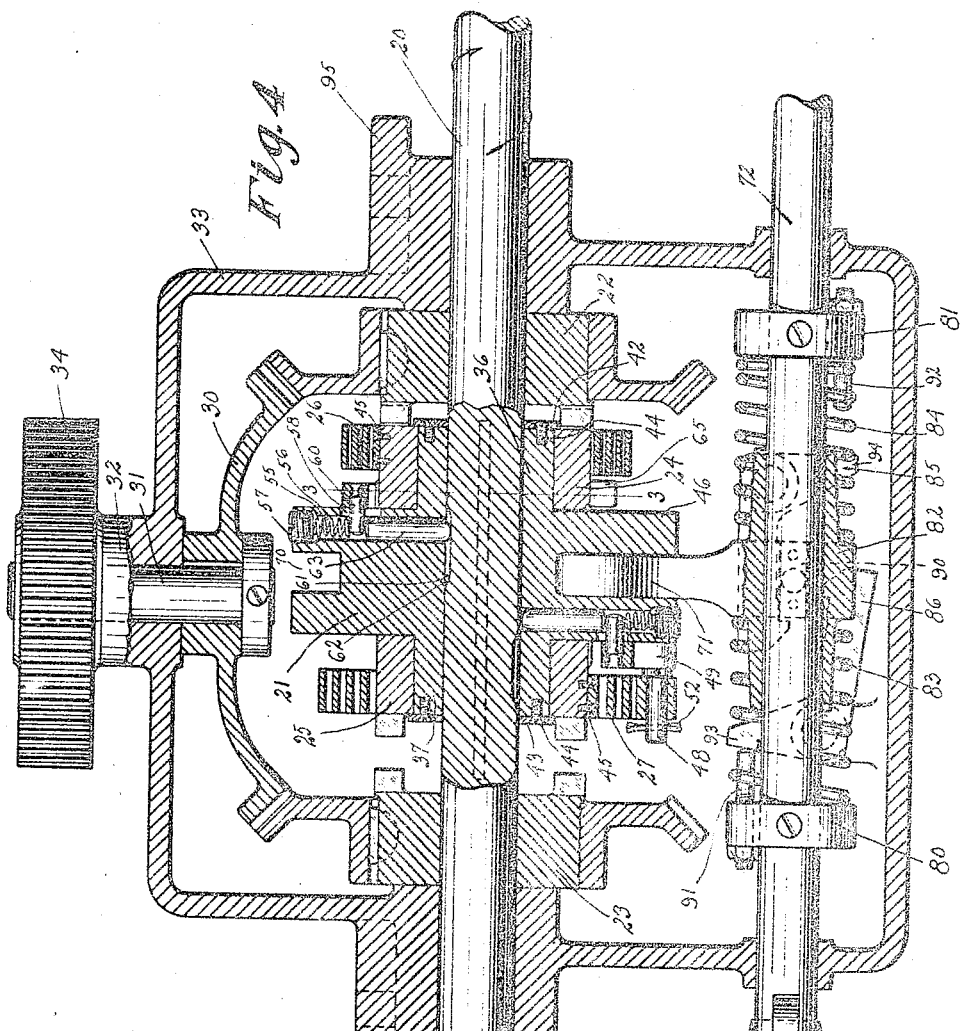

Patented Oct. 17, 1922.

1,432,653

UNITED STATES PATENT OFFICE.

GEORGE I. ALDEN, OF WORCESTER, MASSACHUSETTS, ASSIGNOR TO NORTON COMPANY, OF WORCESTER, MASSACHUSETTS, A CORPORATION OF MASSACHUSETTS.

DRIVING AND REVERSING MECHANISM.

Application filed May 12, 1920. Serial No. 380,872.

*To all whom it may concern:*

Be it known that I, GEORGE I. ALDEN, a citizen of the United States of America, residing at Worcester, in the county of Worcester and State of Massachusetts, have invented certain new and useful Improvements in Driving and Reversing Mechanisms, of which the following is a full, clear, and exact specification.

My invention relates to a driving mechanism for machines having massive reciprocable parts, and more particularly to an easy stop and start mechanism adapted for driving and reversing the work table of a machine tool, such as a grinding machine, lathe, or planer.

In the operation of a machine tool where a table is reciprocated, the rate of traverse is limited by the capability of the machine to withstand the shock and the strain due to the reversing movement. Moreover, the accuracy of the machine depends upon the smoothness of reversal. It has been proposed to use a spring in the connections to take up the momentum of the moving parts when the reversing clutch is thrown and to start them in the reverse direction. In such a construction, the spring is compressed, in starting the mechanism, to a greater degree than is necessary for driving the table at its normal rate, with the result that there is a tendency for the spring to rebound or expand rapidly and to start the reverse movement with an uneven motion, causing vibration of the parts of the machine.

It is accordingly an object of my invention to provide a resilient connection between the driving and driven members and to cause the driven member to stop easily and start gradually from rest to full speed and to prevent an uneven movement of the driven member during the starting action.

A still further object is to associate a yielding driving connection intimately with a reversing mechanism, whereby a simple, compact, inexpensive and self-contained structure is provided.

With these and other objects in view, as will appear from the following disclosure, my invention resides in the combination of parts illustrated in the drawings, described in the specification and pointed out in the claims at the end of the specification.

A preferred form of my invention is shown in the drawings, in which:

Fig. 4 is a horizontal cross section through the casing carrying the reversing and driving mechanism; and Fig. 5 is a detail view of the "load and fire" mechanism.

In the practice of my invention, I provide a driving and reversing mechanism adapted for reciprocating a heavy body, and particularly the table of a machine tool such as a grinding machine, in which a resilient means is interposed in the driving connections for starting and stopping the table gradually at the end of its stroke without shock or irregular movement, which means is held in the maximum stressed condition attained during movement in one direction and released at the end of the movement of the table in that direction. One form of such means comprises a spring which may be held locked in its maximum stressed condition, as by means of a pawl and ratchet mechanism. This spring driving means may be incorporated in and form a part of the reversing clutch mechanism of the table.

Figure 1:
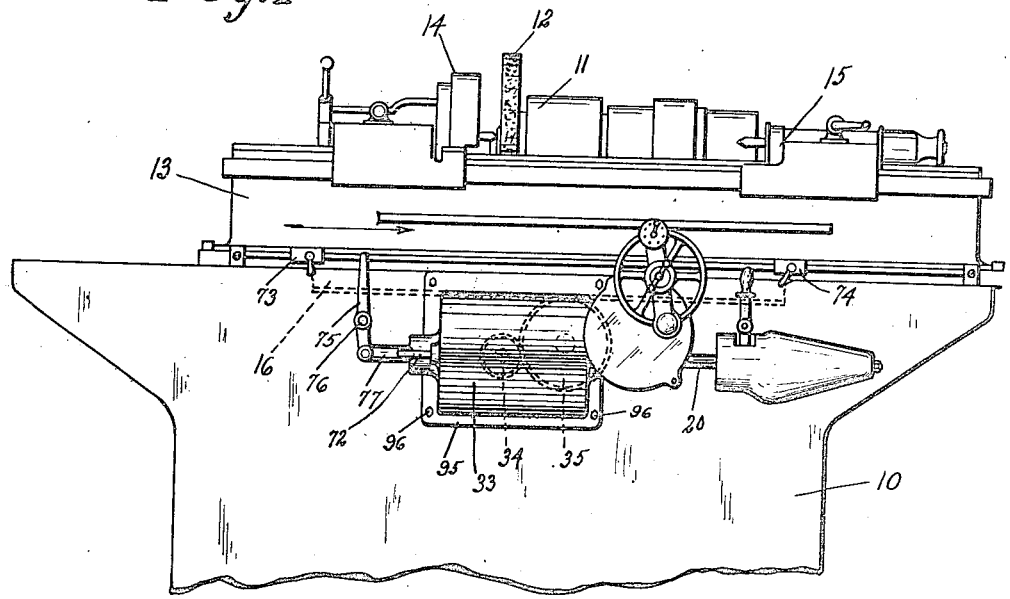
Fig. 1 is a side elevation of a grinding machine with which my invention is utilized, the lower part of the base being broken away.

Referring to the drawings, I have there illustrated in Fig. 1 one type of machine, to which my invention may be applied, comprising a grinding machine base 10 upon which is suitably supported a wheel head 11 carrying a grinding wheel 12. A table or carriage 13, which may be supported on the usual ways on the base so as to be reciprocable therealong, carries a headstock 14 and tailstock 15. In the lower side of this table is fastened a rack 16, to which is geared the driving and reversing mechanism embodying my invention.

The embodiment of my invention illustrated in the drawings comprises a driving shaft 20 having a clutch member 21 slidably keyed thereto and adapted to engage with cooperating clutch members 22 and 23 rotatably mounted on the shaft. Between relatively movable members of this mechanism, springs are arranged which are adapted to be wound up or placed under tension during a starting or stopping action. In the form illustrated these relatively movable members comprise collars 24 and 25 rotatably mounted on the clutch member 21 and connected thereto by springs 26 and 27, respectively. The rotatable members 22 and 23 are formed as bevel gears which mesh with diametrically opposite sides of the bevel gear 30, the latter being connected through suitable means with the rack 16. This means may comprise a shaft 31 carrying the gear 30 and being journaled in a bearing 32 on a casing 33 enclosing most of the driving and reversing mechanism. I have shown the gear 34 on this shaft meshing with another gear 35, which in turn meshes with the rack 16.

The collars 24 and 25 are held in place on the reduced portions 36 and 37 of the clutch member 21 by annular members 42 and 43 surrounding the shaft 20 and being fastened to the reduced portions on the clutch member by suitable means, such as screws 44. The springs 26 and 27 are shown as spiral springs wound around the collars 24 and 25 and having the inner ends thereof, that is, the ends nearest to the shaft, connected by any suitable means, such as screws 45, to the collars, and the other ends to laterally extending pins 47 and 48 arranged near the outer periphery of the enlarged central portion 46 of the clutch member 21. The ends of the springs may be held on these pins by means such as cotter pins 51 and 52.

Figure 2:
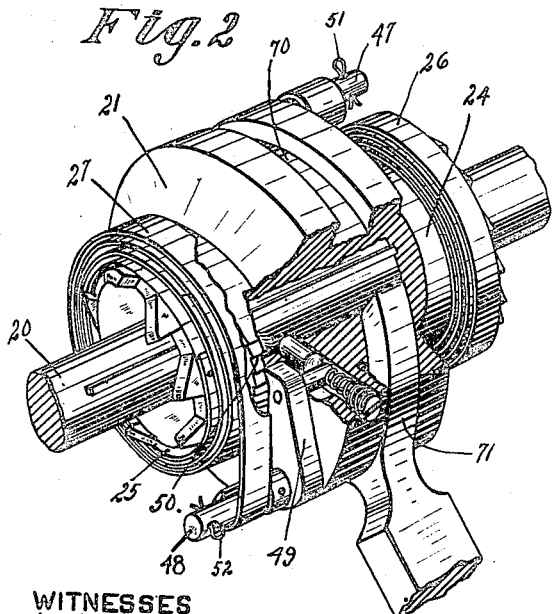
Fig. 2 is a perspective of a part of the clutch mechanism and spring drive, with parts broken away to show details of construction.
Figure 3:
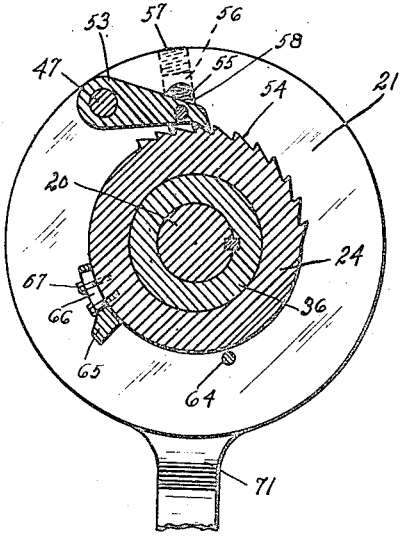
Fig. 3 is a cross section taken on the line 3—3 of Fig. 4.

It will be seen that by this arrangement, when the clutch is reversed to start the parts in the opposite direction, the relatively massive parts, such as the work table and work, will be stopped and started through the spring whose sleeve happens to be in driving engagement with said parts and the spring will be tensioned or stressed. To prevent irregular movements of the parts, I provide means to take up the tension of the spring as rapidly as it is tensioned and to hold it at the maximum tension attained, during the stroke to the end of its movement in that direction. This means for locking the springs, I have shown, in Figs. 2, 3 and 4, as comprising two pawl and ratchet mechanisms, one for each spring, only one of which, the right-hand one (Fig. 4), will be described. The pawl 53 of this mechanism is pivoted at the inner end of the pin 47 and urged toward a ratchet 54, formed on the collar 24, by means of a spring 55. In practice, I find it unnecessary to extend the ratchet all the way around the sleeve, and have shown it extending only through about a 90° arc. The spring 55 is arranged in a bore 56 in the clutch member and is held compressed between a screw plug 57 closing said bore, and a laterally extending pin 60 near the free end of the pawl. This pin extends into the bore 56 through an opening 58, allowing movement of the pawl to engaging and disengaging positions. To relieve the tension of the driving spring when the clutch is reversed, I provide a groove 61 in the driving shaft, said groove having an incline or cam 62 at one end. When the spring 26 is driving, a plunger 63 slidably mounted at the inner end of the bore 56 rests at one end in this groove, while its other end is in engagement with the pin 60 on the pawl. The groove is of such length that, when the clutch member is thrown to reverse from the position shown in Fig. 4, the plunger 63 will ride up the incline at the end of the groove and raise the pawl out of engagement with the ratchet. This releases the spring and would allow it to unwind completely, but I prefer to hold the spring at all times under a certain tension, so that when it again starts to drive the table it will not have to be wound up from its idle position, and to this end I provide a stop pin 64 on the clutch member 21 and an adjustable stop engaging member 65 on the sleeve 24 (Fig. 3) to limit the unwinding of the spring. For adjusting the member 65, I provide it with a slot 66, through which clamping screws 67 extend into the sleeve 24 for clamping the member in adjusted position. The purpose of this adjustment is to allow the springs to be held at more or less initial tension, as may be desired. The springs and control devices on opposite sides of the clutch member 21 are symmetrically arranged on opposite sides of the shaft 20 to balance the rotating parts.

For throwing the reversing clutch member 21, I provide it with an annular groove 70 in which the bifurcated arm 71 of the shifting mechanism engages. This shifting arm may obviously be thrown by hand or by any form of "load and fire" mechanism operated automatically by the movement of the table, but I prefer to use the simplified "load and fire" mechanism shown, which comprises a rod or bar 72 slidably mounted in the opposite sides of the casing 33 and connected to be reciprocated by the table dogs 73 and 74, which are adjustably mounted in the usual manner on the table to provide for work of different lengths. As a means for connecting the rod 72 for operation by the dogs, I provide a lever 75 pivoted to the base 10 at 76 and connected to the rod by a link 77. Suitably spaced collars 80 and 81 are secured to the rod 72 and slidably mounted on the rod between these collars is the sleeve 82 connected to the arm 71. Between these collars and the sleeve are arranged the springs 83 and 84 for throwing the clutch. Pawls 85 and 86 are pivoted to the casing on pivots 87 and 88 in position to hold the sleeve at either end of its movement and against the tension of the springs. A laterally extending lug 90 is provided on the sleeve 82 to cooperate with the pawls for this purpose. I provide the sleeves 80 and 81 with pins 91 and 92 which are adapted, when the rod 72 is shifted endwise the required distance, to engage laterally extending arms 93 and 94 on the pawls to disengage them from the lug 90, thus allowing the spring, which has been compressed by this shifting of the rod, to rapidly and positively throw the clutch.

I may form the casing 33, in which the driving and reversing mechanism is contained, with an integral flange 95 (Figs. 1 and 4) for fastening it to the base of the machine, as by bolts 96, an opening being provided in the base to receive the inner reduced part of the casing.

In describing the operation of the device, let us assume that the table is being driven in the direction of the arrow (Fig. 1). The parts will then be in the positions as shown in the various figures of the drawing. The spring 26 is under the maximum tension attained during the stroke in this direction, which would ordinarily, although not necessarily, be the starting tension, and it is so held by the pawl 53. As the table reaches the end of its stroke, the dog 73 rocks the lever 75 to move the rod 72 toward the left (Figs. 1 and 4), thus compressing the spring 84, since the pawl 85 prevents the sleeve 82 from sliding endwise. This movement continues until the pin 92 strikes the arm 94 of the pawl and releases the sleeve to the action of the spring 84, which rapidly throws the clutch to reverse the parts. When the clutch is reversed, the table continues for a short distance on account of its momentum, but it is gradually stopped and started in the opposite direction with a smooth and even movement through the action of the spring 27, which is compressed by the momentum of the table and the starting torque, its coacting pawl 49 operating by engagement with the ratchet 50 on collar 25 to prevent unwinding, while the table is being driven to the other end of its traverse. When the clutch is thrown, pawl 53 is automatically disengaged from the ratchet 54 by the action of the cam on incline 62 upon the plunger 63 and the tension of the spring 26 is thereby relieved.

From the foregoing description it will be seen that I have provided a table driving and reversing mechanism in which I obtain an easy stop and start of the table, and a drive thereof substantially free from irregular movements, whereby shock and vibration are substantially eliminated and the life and efficiency of the machine is increased. The device forming the subject of my invention is also desirable in that it is simple in design, compact, and readily assembled and attached to the machine structure. The casing in which the reversing gear is mounted is admirably adapted for making it an oil-tight structure, to the end that it may be filled with oil and the moving parts constantly lubricated, all of which tends to further increase the life of the machine.

Although I have herein described in detail a specific embodiment of my invention, I do not wish to limit myself to the particular construction or arrangements of parts shown and described, as obvious modifications will occur to one skilled in the art.

What I claim as new and desire to secure by Letters Patent is:

1. In a machine having a reciprocable body, a driving mechanism therefor, comprising a driving member, a resilient device operatively connecting said member with said body and adapted to start the latter gradually into motion and means to hold said resilient device in a stressed condition after the body has been started and during its stroke.

2. In a machine having a reciprocable table, a driving and reversing mechanism therefor comprising a driver, a resilient connection between said driver and the table to bring the latter gradually from its position of rest to full speed, and releasable locking means to hold said resilient connection at the maximum tension acquired thereby and thereafter drive the table at its normal speed.

3. In a table driving and reversing mechanism, a driving member, a driven member adapted to reciprocate the table, and a reversing clutch mechanism comprising a resilient connection between said members operative at reversal to stop and start the table without shock and consequent vibration, and means acting during the normal drive of the table to hold said resilient connection in its maximum stressed condition.

4. In a machine having a reciprocable table, a driving shaft, a driven shaft operatively connected to the table, a reversing mechanism, including a spring, interposed between said shafts, and locking means for holding said spring under the maximum starting tension, whereby shock and vibration are substantially eliminated during the traverse of the table.

5. In a machine having a reciprocable table, a driving shaft, a reversing mechanism operatively connected to the table, comprising a clutch associated with said shaft and including relatively movable members, a spring between said members, and releasable means for holding said spring under the maximum tension attained during a reciprocation until the clutch is reversed.

6. In a machine having a reciprocable body driving mechanism comprising a resilient means for bringing said body gradually from its position of rest to full speed, means for holding said resilient means at the maximum tension acquired thereby, and means for releasing the tension at the end of the stroke.

7. In a table driving and reversing mechanism adapted for use in grinding machines, the combination of a driving shaft, a driven shaft and means operating between said shafts for reversing the motion of the driven shaft without shock, comprising a clutch member keyed to the driving shaft, rotatable collars mounted thereon and adapted to connect with the driven shaft, said sleeve and said collars being connected by springs.

8. In a table driving mechanism, a driving shaft, a driven shaft, and mechanism interposed in the connection between said shafts comprising relatively rotatable members, a spring connecting said members, means for holding said spring under the load-starting tension during the normal stroke of the table, and means for releasing the tension at the end of the stroke.

9. In a table reversing mechanism for a grinding machine, in combination with a driven shaft and a clutch for reversing the motion of said shaft, a resilient device connecting said clutch and shaft, locking means for holding said resilient device at the load-starting tension, whereby the table is driven with an even movement and without shock, and means for automatically releasing said resilient device to allow it to return to normal at the end of the stroke of the table.

10. In a machine tool having a reciprocable table, a driving shaft, a driven member operatively connected with the table, a clutch reversing mechanism, including a resilient device operatively connecting said shaft with said member, adapted to bring the table gradually from rest to full speed in either direction, releasable means to hold said resilient device during each stroke at the maximum tension acquired thereby and automatically operated means to release the tension of the resilient device before the beginning of the next stroke in the same direction.

11. In a table driving and reversing mechanism adapted for use in grinding machines, the combination of a driving shaft continuously rotating in the same direction, a driven means, and means for automatically reversing the motion of the driven means without shock, comprising a clutch sleeve keyed to the driving shaft, collars rotatably mounted on said clutch sleeve and carrying the engaging members of the clutch, springs having their ends connected to said collars and said clutch sleeve, pawl and ratchet means between said collars and said sleeve to lock the springs at the starting tension, and throw-off means for said pawls whereby the spring through which the load is being driven will be released when the clutch is reversed.

12. In a table driving and reversing mechanism adapted for use in grinding machines, the combination of a driving shaft, a driven shaft, and means for reversing the motion of the driven shaft without shock comprising a clutch sleeve keyed to the driving shaft, collars rotatably mounted on said clutch sleeve and carrying the engaging members of the clutch, springs having their ends connected to said collars and said clutch sleeve, pawl and ratchet means between said collars and said sleeve to hold the springs at the maximum tension attained during a stroke of the table, and cam mechanism for disconnecting said pawls at the end of the stroke, whereby the spring through which the table is being driven will be released when the clutch is reversed.

13. In a table driving and reversing mechanism, the combination of a driving shaft, a driven member, and means for reversing the motion of the driven member without shock comprising a clutch sleeve keyed to the driving shaft, collars rotatably mounted on said clutch sleeve and carrying the engaging members of the clutch, springs having their ends connected to said collars and said clutch sleeve, pawl and ratchet means between said collars and said sleeve to hold the springs at the maximum tension attained, during a stroke of the table, and cam mechanism comprising cams on the driving shaft and plungers cooperating therewith on the clutch sleeve for disconnecting said pawls at the end of the stroke, whereby the spring through which the table is being driven will be released when the clutch is reversed.

Signed at Worcester, Massachusetts, this 10th day of May 1920.

GEORGE I. ALDEN.